Patented Apr. 10, 1923.

1,451,330

UNITED STATES PATENT OFFICE.

HENRY DREYFUS, OF LONDON, ENGLAND.

MANUFACTURE OF CELLULOSE DERIVATIVES.

No Drawing. Application filed August 5, 1920. Serial No. 401,383.

*To all whom it may concern:*

Be it known that I, HENRY DREYFUS, a citizen of the Swiss Republic, of London, England, have invented certain new and useful Improvements in or Relating to the Manufacture of Cellulose Derivatives, of which the following is a specification.

I have found that it is possible to introduce into the hydroxyl groups of cellulose or cellulosic bodies one or more benzyl groups. Instead of benzyl groups, homologues of them in the nucleus or the side chain may be introduced, such for example as methyl benzyl groups, phenylethyl groups corresponding to side chain chlorethyl benzenes ($C_6H_5.CH_2.CH_2.Cl$ or $C_6H_5CHCl.CH_3$), or substitution groups of any of the benzyl or homologous groups, in the nucleus, such as methoxy benzyl groups. Also groups derived from xylenes may be introduced or their substitution products or homologues, for example using as agents xylene derivatives in which one hydrogen atom of each or any methyl group or groups is replaced by chlorine atoms. All such groups are hereinafter and in the claiming clauses referred to as aralkyl groups.

The present invention consists in producing aralkyl ethers of cellulose by introducing into the hydroxyl groups of cellulose or cellulosic bodies one or more benzyl groups or other aralkyl groups above referred to, that is to say replacing the hydrogen of one or more of the hydroxyl groups of the cellulose or cellulosic bodies by one or more such groups as aforesaid.

As starting material for the process it is preferred to use cellulose or near conversion products thereof, preferably as little depolymerized as possible. In particular cellulose or cellulose conversion products insoluble in alkali are employed.

In carrying out the invention I treat the cellulose or conversion product in the presence of caustic alkali or other suitable basic substances, with the suitable benzyl compounds, their homologues or substitution products of either as explained above, for example benzyl chloride or benzyl bromide, or with any other suitable replacing body such as herein referred to.

The execution of the process with basic substances such as caustic alkali, or any other suitable base, may take place in such manner that the cellulose or conversion product is impregnated with alkali, preferably in a concentrated form, and afterwards treated with benzyl chloride, benzyl bromide, or other suitable replacing body giving a similar result, or with the homologues or substitution products or replacing bodies before referred to, all of which agents are hereinafter and in the claiming clauses referred to as aralkylating agents.

For carrying out the process, only a reduced quantity of water, or even no water, is preferably introduced or employed in the benzylating or other reaction, as it is found that the yield and quality of the products are detrimentally affected by the presence of much water.

In carrying out the invention, the quantity of water present whether contained in or added to the cellulose or cellulose conversion product before the reaction or added during the reaction (but disregarding water which may be formed in the reaction itself) should at no stage of the reaction be greater than from about the natural humidity content of the cellulose or cellulose conversion product, up to about 200%, and in any case not greater than about 400% relatively to the weight of the cellulose or conversion product (taken as about 100%) and preferably not in greater amount than 100% to 150% relatively to the weight of the cellulose or conversion product. One may go below 50%, for example to about the ordinary humidity content of the cellulose, and add the alkali in a powdered state and grind it with the cellulose or conversion product; it is however less advantageous to go below about 50% water content.

It is understood that the restricted quantities of water before mentioned may be present in or introduced into the cellulose or conversion product prior to the reaction or may be introduced partly or entirely during the reaction. By way of illustration, the cellulose having the desired amount of water above indicated contained in it or introduced into it, the alkali may be added in powdered form for example; or one may start with a more or less concentrated solution of alkali in water corresponding to the above indicated limits of water quantity. Or one may start with an alkaline solution and impregnate the cellulose with this solution, under such conditions that the amount of water will correspond before or during the reaction to the above stated limits of water content. Thus, for example, the cellulose may be impregnated with a 50% alkali solution and pressed out afterwards to such an extent that say about 100% of water remains in it (relatively to the weight of the cellulose taken as 100%), and a corresponding quantity of alkali, whilst the rest of the alkali is added in powdered form before or during the reaction. Or any other concentration of alkaline solution may be adopted and the water content be brought down within the above limits by pressing out or hydro-extracting or any other means for removing humidity, the rest of the alkali being added all at once, either continuously or at intervals in different stages.

It is to be understood, however, that the relationship between the quantity of alkali employed and the quantity of water or humidity shall be such as would correspond to a solution of about 75% to 95% or more of alkali hydroxide in the above stated limits of water quantity, and in any case to a solution of not less than about 50%, if the total alkali employed were dissolved in solid or other form in such a quantity of water,—that is to say, the total alkali used is at least equal in weight to the weight of water present or added as mentioned and preferably exceeds the same in a ratio of from 3:1 to 19:1 or more. This indication is of course only given as a standard or guide as to the total quantities of water and alkali employed in the process, as it is understood that during the reaction the alkali content decreases in proportion as the reaction with the replacing body such as benzyl chloride, benzyl bromide, and so forth, proceeds, and that the alkali may be added all at once before the reaction or in portions at different stages of the reaction or continuously during the reaction as before mentioned.

The whole of the alkali may be added prior to the treatment with the benzylating or other replacing body, such as referred to or it may be added continuously or at intervals or stages during the reaction. In the same way the whole of the benzylating or other replacing body may be incorporated or added at once or in portions at a time or continuously during the process.

The reaction with the benzyl chloride or other benzylating or replacing bodies such as above referred to, is preferably carried out at temperatures of from about ordinary temperature up to about 100° C.; higher temperatures may be employed, though there is no advantage in this.

Example 1.

Cellulose or a near conversion product thereof not soluble in alkali is impregnated with a concentrated caustic soda solution, e. g. of about 50% strength, so that about four molecular equivalents of caustic soda are contained in it relatively to one molecular equivalent of cellulose $C_6H_{10}O_5$. The mass is then kneaded with two to three molecular equivalents of benzyl chloride. The reaction proceeds quickly if heated say for example between about 50° and 150° C. preferably 50°–100° C. After about 2 hours heating and mixing, six further molecular equivalents of caustic soda are added in the form of powder and the mass is kneaded with a further 3 to 5 molecular equivalents of benzyl chloride at a similar temperature to the above. If desired a further addition of 6 molecules of alkali and 3 to 4 molecules of benzyl chloride may be similarly made. The product is soluble (amongst other solvents), in chloroform and in benzol, and gives excellent films corresponding to all commercial requirements. If a lower temperature than that above stated is employed for the reaction, the reaction takes longer.

Example 2.

Instead of working in the above way, the cellulose or conversion product may be impregnated with water, for example with about 100% to 400% of water, but preferably not more than 50% to 150% of water, relatively to 100% weight of cellulose, and the alkali be added in powdered form, the procedure being otherwise similar to that just described and the product being similar.

The particular methods described are only given by way of illustration and can be varied considerably without departing from the spirit of the invention.

The whole of the alkali may be added prior to the treatment with benzyl chloride. In the same way the whole of the benzyl chloride may be incorporated or added at once or in portions at a time or uninterruptedly during the process.

The benzyl chloride may be replaced by benzyl bromide or mixtures of benzyl chloride and bromide or by any other suitable benzylating agents, or other replacing bodies of the character hereinbefore referred to may be employed.

The reaction may be carried out with or without employment of higher or lower boiling diluents or solvents not themselves liable to undergo etherification, such for example as benzol.

Such liquids allow the operation to be conducted more easily from a mechanical point of view as they render the mass more easy to work or knead and assist the homogeneous distribution of the benzylating or other replacing body throughout the mass. The benzol or other such liquid may be used in any suitable proportion, for example in a quantity about equal to that of the benzyl chloride or other replacing body.

The reaction may be carried out in the presence of traces of copper powder, copper salts or hydroxides or any other suitable contact substance which facilitates the exchange of the halogen or other benzylating body or replacing body.

Instead of caustic soda, caustic potash or other alkali may be used.

According to the quantity of benzyl chloride or other replacing bodies used for introducing groups such as hereinbefore referred to, one, two or more of such groups may be introduced into the cellulose.

Mixed cellulose derivatives may be produced in which different aralkyl radicals or groups are introduced into the cellulose, for example by first treating the cellulose or conversion product with alkali and one aralkyl body, for instance benzyl chloride, and afterwards with further alkali and another aralkyl body, for instance chlorbenzyl chloride.

The new cellulosic derivatives obtained according to the invention may be applied or employed for all applications where cellulose esters or ethers might be used, as for example celluloid-like masses, cinematographic, photographic or other films, artificial filaments, electric insulating materials, coating solutions, varnishes and any other applications, in combination or not with any known or suitable solvents, plastifying agents or other substances. Any known or suitable methods may be applied, as for example mixing the new derivatives with solvents or plastifying bodies of high boiling point and solvents of low boiling point for making films or celluloid, or with solvents of either or both classes for making solutions, dopes, varnishes, artificial filaments and so on. Any suitable machines or apparatus may be employed for example such as usual for making nitro- or actyl-cellulose films and celluloid manufacture, artifical filaments and so forth.

What I claim and desire to secure by Letters Patent is:—

1. Process for the manufacture of cellulosic derivatives, being aralkyl ethers of cellulose, comprising treatment of a cellulosic body with an aralkylating agent in presence of a base.

2. Process for the manufacture of cellulosic derivatives, being aralkyl ethers of cellulose, comprising treatment of a cellulosic body not soluble in alkali, with an aralkylating agent in presence of alkali.

3. Process for the manufacture of aralkyl ethers of cellulose, comprising treating a cellulosic body not soluble in alkali, with an aralkylating agent in presence of akali, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

4. Process for the manufacture of aralkyl ethers of cellulose, comprising treating a cellulosic body not soluble in alkali with an aralkylating agent in presence of alkali, while restricting the water present, disregarding that formed in the reaction itself, to an amount not greater than from about the natural humidity content of the cellulosic body up to about one and a half times the weight of the cellulosic body, the total alkali used in the process being at least equal in weight to the said restricted quantity of water, disregarding water formed in the reaction.

5. Process for the manufacture of aralkyl ethers of cellulose, comprising treating a cellulosic body not soluble in alkali with an aralkylating agent in presence of akali, while restricting the water present, disregarding that formed in the reaction itself, to an amount not greater than from about the natural humidity content of the cellulosic body up to about four times the weight of the cellulosic body, the total alkali used in the process exceeding in a ratio of from 3:1 and upwards, the weight of said restricted quantity of water, disregarding water formed in the reaction.

6. Process for the manufacture of aralkyl ethers of cellulose, comprising treating a cellulosic body not soluble in alkali with an aralkylating agent in presence of alkali while restricting the water present, disregarding that formed in the reaction itself, to an amount not greater than from about the natural humidity content of the cellulosic body up to about one and one-half times the weight of the cellulosic body, the total alkali used in the process exceeding, in a ratio of from 3:1 to 19:1, the weight of said restricted quantity of water, disregarding water formed in the reaction.

7. Process for the manufacture of aralkyl ethers of cellulose, comprising treating a cellulosic body not soluble in alkali with an aralkylating agent in presence of alkali while restricting the water present, disregarding that formed in the reaction itself, to an amount not greater than from about the natural humidity content of the cellulosic body up to about one-half the weight of the cellulosic body, the total alkali used in the process exceeding in a ratio of from 3:1 and upwards, the weight of said restricted quantity of water, disregarding water formed in the reaction.

8. Process for the manufacture of aralkyl ethers of cellulose, comprising treating a cellulosic body not soluble in alkali with an aralkylating agent in presence of alkali while restricting the water present, disregarding that formed in the reaction itself, to an amount not greater than from about the natural humidity content of the cellulosic body up to about one-half the weight of the cellulosic body, the total alkali used in the process exceeding in a ratio of from 3:1 to 19:1, the weight of said restricted quantity of water, disregarding water formed in the reaction.

9. Process for the manufacture of aralkyl ethers of cellulose, comprising treating a cellulosis body not soluble in alkali, with aralkyl halide in presence of alkali, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

10. Process for the manufacture of aralkyl ethers of cellulose, comprising treating a cellulosic body not soluble in alkali with aralkyl halide in presence of alkali, while restricting the water present, disregarding that formed in the reaction itself, to an amount not greater than from about the natural humidity content of the cellulosic body up to about one and one-half times the weight of the cellulosic body, the total alkali used in the process exceeding, in a ratio of from 3:1 to 19:1 the weight of said restricted quantity of water, disregarding water formed in the reaction.

11. Process for the manufacture of aralkyl ethers of cellulose, comprising treating a cellulosic body not soluble in alkali, with aralkyl halide, in presence of alkali, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction, the temperature observed during the reaction not being greater than about 150° C.

12. Process for the manufacture of aralkyl ethers of cellulose, comprising treating a cellulosic body not soluble in alkali, with aralkyl halide, in presence of alkali, while restricting the water present, disregarding that formed in the reaction itself, to an amount not greater than from about the natural humidity content of the cellulosic body up to about one and one-half times the weight of the cellulosic body, the total alkali used in the process exceeding, in a ratio of from 3 to 1 and upwards, the weight of said restricted quantity of water disregarding water formed in the reaction, the temperature observed during the reaction not being greater than about 100° C.

13. Process for the manufacture of aralkyl ethers of cellulose, comprising treating a cellulosic body not soluble in alkali with aralkyl chloride in presence of alkali, while restricting the water present, disregarding that formed in the reaction itself, to an amount not greater than from about the natural humidity content of the cellulosic body up to one and a half times the weight of the cellulosic body, the total alkali used in the process exceeding, in a ratio of 3:1 and upwards, the weight of said restricted quantity of water, disregarding water formed in the reaction.

14. Process for the manufacture of aralkyl ethers of cellulose, comprising treating a cellulosic body not soluble in alkali with aralkyl halide, in presence of alkali, while restricting the water present, disregarding that formed in the reaction itself, to an amount not greater than from about the natural humidity content of the cellulosic body up to about one and one-half times the weight of the cellulosic body, the total alkali used in the process exceeding in a ratio of from 3:1 to 19:1, the weight of said restricted quantity of water, disregarding water formed in the reaction, the temperature observed during the reaction being between about 50° and 100° C.

15. Process for the manufacture of benzyl cellulose, comprising treating a cellulosic body not soluble in alkali with benzyl chloride in presence of alkali, while restricting the water present, disregarding that formed in the reaction itself, to an amount not greater than from about the natural humidity content of the cellulosic body up to about four times the weight of the cellulosic body, the total alkali used in the process being at least equal in weight to the said restricted quantity of water, disregarding water formed in the reaction.

16. Process for the manufacture of benzyl cellulose, comprising treating a cellulosic body not soluble in alkali with benzyl chloride in presence of alkali, while restricting the water present, disregarding that formed in the reaction itself, to an amount not greater than from about the natural humidity content of the cellulosic body up to about four times the weight of the cellulosic body, the total alkali used in the process exceeding in a ratio of from 3 to 1 and upwards, the weight of said restricted quantity of water, disregarding water formed in the reaction.

17. Process for the manufacture of benzyl cellulose comprising treating a cellulosic body not soluble in alkali with benzyl chloride in presence of alkali, while restricting the water present, disregarding that formed in the reaction itself, to an amount not greater than from about the natural humidity content of the cellulosic body up to about one and one-half times the weight of the cellulosic body, the total alkali used in the process exceeding, in a ratio of from 3:1 to 19:1, the weight of said restricted quantity of water, disregarding water formed in the reaction.

18. Process for the manufacture of benzyl cellulose, comprising treating a cellulosic body not soluble in alkali, with benzyl chloride in presence of alkali, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction, the temperature observed during the reaction not being greater than about 150° C.

19. Process for the manufacture of benzyl cellulose, comprising treating a cellulosic body not soluble in alkali with benzyl chloride in presence of alkali, while restricting the water present, disregarding that formed in the reaction itself, to an amount not greater than from about the natural humidity content of the cellulosic body up to about one and one-half times the weight of the cellulosic body, the total alkali used in the process exceeding, in a ratio of from 3:1 to 19:1, the weight of said restricted quantity of water, disregarding water formed in the reaction, and the temperature observed during the reaction being between about 50° and 100° C.

20. Process for the manufacture of aralkyl ethers of cellulose, comprising treating a cellulosic body not soluble in alkali with aralkyl halide in presence of alkali, while restricting the water present, disregarding that formed in the reaction itself, to an amount not greater than from about the natural humidity content of the cellulosic body up to about four times the weight of the cellulosic body, the alkali being employed in a total proportion of about 10–16 molecules and the aralkyl halide in a total proportion of about 5–12 molecules per molecule of the cellulosic body reckoned on a basis of $C_6H_{10}O_5$.

21. Process for the manufacture of aralkyl ethers of cellulose, comprising treating a cellulosic body not soluble in alkali with aralkyl chloride in presence of alkali, while restricting the water present, disregarding that formed in the reaction itself, to an amount not greater than from about the natural humidity content of the cellulosic body up to about one and one-half times the weight of the cellulosic body, the alkali being employed in a total proportion of about 10–16 molecules, and the aralkyl chloride in a total proportion of about 5–12 molecules per molecule of the cellulosic body reckoned on a basis of $C_6H_{10}O_5$ for cellulose.

22. Process for the manufacture of aralkyl ethers of cellulose, comprising impregnating with alkali a cellulosic body not soluble in alkali, and thereafter treating it with an aralkylating agent in presence of further alkali, said further alkali being added in solid form.

23. Process for the manufacture of aralkyl ethers of cellulose, comprising impregnating with alkali a cellulosic body not soluble in alkali, and thereafter treating the cellulosic body with an aralkylating agent in presence of further alkali, said further alkali being added in solid form, the water used in the reaction, disregarding that formed in the reaction, being restricted to an amount not greater than about four times the weight of the cellulosic body and the total alkali used in the process being at least equal in weight to said restricted quantity of water, disregarding water formed in the reaction.

24. Process for the manufacture of aralkyl ethers of cellulose, comprising impregnating with alkali a cellulosic body not soluble in alkali, and thereafter etherifying the cellulosic body with aralkyl halide in presence of further alkali, the further alkali being added by stages in solid form and the aralkyl halide being also added by stages, and the water used in the reaction, disregarding that formed in the reaction, being restricted to an amount not greater than about one and one-half times the weight of the cellulosic body, the total alkali used in the process being at least equal in weight to said restricted quantity of water, disregarding water formed in the reaction.

25. Process for the manufacture of benzyl cellulose, comprising impregnating with alkali a cellulosic body not soluble in alkali, and thereafter etherifying the cellulosic body with benzyl chloride in presence of further alkali, the further alkali being added by stages in solid form, and the benzyl chloride being also added by stages, and the water used in the reaction, disregarding that formed in the reaction being restricted to an amount not greater than about one and one-half times the weight of the cellulosic body, the total alkali used in the process being at least equal in weight to said restricted quantity of water, disregarding water formed in the reaction.

26. Process for the manufacture of aralkyl ethers of cellulose, comprising treating a cellulosic body not soluble in alkali, with an aralkylating agent in presence of alkali, while restricting the water present, disregarding that formed in the reaction itself to an amount not greater than from about the natural humidity content of the cellulosic body up to about four times the weight of the cellulosic body, the total alkali used in the process being at least equal in weight to said restricted quantity of water, disregarding water formed in the reaction, the etherification being performed in the presence of a diluent not liable to be etherified by the etherifying agent.

27. Process for the manufacture of aralkyl ethers of cellulose, comprising treating a cellulosic body not soluble in alkali, with an aralkylating agent in presence of alkali, while restricting the water present, disregarding that formed in the reaction itself, to an amount not greater than from about the natural humidity content of the cellulosic body up to about four times the weight of the cellulosic body, the total alkali used in the process exceeding, in a ratio of from 3 to 1 and upwards, the weight of said restricted quantity of water, disregarding water formed in the reaction, the etherification being performed in presence of a diluent not etherifiable by the aralkylating agent.

28. Process for the manufacture of aralkyl ethers of cellulose, comprising treating a cellulosic body not soluble in alkali, with aralkyl halide in presence of alkali and of a contact substance favoring exchange of halogen, while restricting the water present, disregarding that formed in the reaction itself, to an amount not greater than from about the natural humidity content of the cellulosic body up to about four times the weight of the cellulosic body, the total alkali used in the process being at least equal in weight to said restricted quantity of water, disregarding water formed in the reaction.

29. As new products aralkyl ethers of cellulose being cellulosic derivatives wherein hydroxyl hydrogen of the cellulose is substituted by aralkyl.

30. As new products, aralkyl ethers of cellulose, wherein the hydroxyl hydrogens of the cellulosic body are partially substituted by aralkyl.

31. As new products, benzyl ethers of cellulose.

32. As new products, benzyl ethers of cellulose, wherein the hydroxyl hydrogens of the cellulosic body are partially substituted by benzyl.

33. Process for the manufacture of aralkyl ethers of cellulose, comprising impregnating with alkali a cellulosic body not soluble in alkali, and thereafter treating the cellulosic body with an aralkylating agent in presence of further alkali, said further alkali being added in solid form, the water used in the reaction, disregarding that formed in the reaction, being restricted to an amount not greater than from about the natural humidity content of the cellulosic body up to about four times the weight of the cellulosic body.

34. Process for the manufacture of aralkyl ethers of cellulose, comprising impregnating with alkali a cellulosic body not soluble in alkali, and thereafter treating the cellulosic body with an aralkylating agent in presence of further alkali, said further alkali being added by stages in solid form, and the aralkylating agent being also added by stages, the water used in the reaction, disregarding that formed in the reaction, being restricted to an amount not greater than from about the natural humidity content of the cellulosic body up to about one and a half times the weight of the cellulosic body and the total alkali used in the process being at least equal in weight to said restricted water quantity, disregarding water formed in the reaction.

In testimony whereof I have hereunto subscribed my name.

HENRY DREYFUS.